US008875121B2

(12) United States Patent
Subbu et al.

(10) Patent No.: US 8,875,121 B2
(45) Date of Patent: Oct. 28, 2014

(54) FRAMEWORK FOR MULTI-TYPE AND MULTI-LOCATION FIRMWARE UPDATES AND HARDWARE FEATURE UPDATES THROUGH A SINGLE INTERFACE PROTOCOL

(71) Applicant: NVIDIA Corporation, Santa Clara, CA (US)

(72) Inventors: Vijayakumar Subbu, Karnataka (IN); Poyen Huang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 165 days.

(21) Appl. No.: 13/670,292

(22) Filed: Nov. 6, 2012

(65) Prior Publication Data

US 2014/0130034 A1    May 8, 2014

(51) Int. Cl.
    *G06F 9/445* (2006.01)
(52) U.S. Cl.
    USPC .......................................................... 717/172
(58) Field of Classification Search
    CPC .............. G06F 3/123; G06F 8/65; G06F 8/67
    USPC ......................................................... 717/172
    See application file for complete search history.

(56) References Cited

U.S. PATENT DOCUMENTS

| 6,978,018 | B2 | 12/2005 | Zimmer | |
|---|---|---|---|---|
| 7,480,907 | B1* | 1/2009 | Marolia et al. | 717/174 |
| 7,904,708 | B2 | 3/2011 | Harmer | |
| 8,082,436 | B2 | 12/2011 | Harmer | |
| 8,104,068 | B2* | 1/2012 | Shiomi | 725/152 |
| 8,149,838 | B2* | 4/2012 | Saladino et al. | 370/392 |
| 8,631,186 | B2* | 1/2014 | Rothman et al. | 711/103 |
| 8,665,897 | B2* | 3/2014 | Polland et al. | 370/437 |
| 2005/0216753 | A1* | 9/2005 | Dailey et al. | 713/191 |
| 2006/0262788 | A1* | 11/2006 | Johnson et al. | 370/389 |
| 2011/0154009 | A1 | 6/2011 | Harmer | |
| 2011/0321024 | A1* | 12/2011 | Knothe et al. | 717/168 |
| 2013/0104119 | A1* | 4/2013 | Matsuo et al. | 717/173 |
| 2013/0111457 | A1* | 5/2013 | Culter | 717/171 |

OTHER PUBLICATIONS

Zhang et al. "DICOM Image Secure Communications With Internet Protocols IPv6 and IPv4", Jan. 2007, IEEE, vol. 11, No. 1.*
Yocum et al. "Payload Caching: High-Speed Data Forwarding for Network Intermediaries", 2001, USENIX.*
Eicken et al. "U-Net: A User-Level Network Interface for Parallel and Distributed Computing", Dec. 1995, ACM.*
Unified Extensible Firmware Interface Specification, Version 2.3.1, Errata C, Jun. 27, 2012.

* cited by examiner

*Primary Examiner* — Wei Zhen
*Assistant Examiner* — Junchun Wu
(74) *Attorney, Agent, or Firm* — Zilka-Kotab, PC

(57) ABSTRACT

Disclosed are a method, system, and/or apparatus to enable multi-type and multi-location firmware updates and hardware feature updates through a single interface protocol. In one embodiment, a computer-implemented method of updating a platform system firmware and a component device firmware through a single interface protocol includes assigning a unique index number to each of a platform system and a component device, generating a platform system firmware payload, receiving a component device firmware payload, and generating a firmware update package comprising the platform system firmware payload and the component device firmware payload. The method also includes querying the platform payload header and the component payload header using a check image application programming interface and updating at least one of the platform system firmware and the component device firmware by passing at least one of the platform system firmware payload and the component device firmware payload to a set image API.

20 Claims, 11 Drawing Sheets

```
FILE  EDIT  VIEW  TERMINAL  HELP linux:~/t/cardhutz.v8.8.0

~/t/cardhutz.v8.8.0 $ hexdump -c pkg_imge.bin ihead -15
00000000  02 00 00 00 21 BD C9 25  9D EC CB 97 01 63 FD 42   |....!.%.....c.B |
00000010  D0 F2 CB 43 2F 83 46 79  3E C0  64 03 7F 63 2F 30   |...C/.Fy>.D..C/0|
00000020  E5 ED B1 79 4E 56 44 41  50 4B 47 24 6C 09 1E 00   |...YNVDAPKG$l...|
00000030  00 00 00 00 A3 E5 21 71  96 49 4C A8 B6 1F 25 35   |......!q.IL...%5|
00000040  FE 57 4B E3 02 00 00 00  00 00 00 00 00 03 00 00 00   |.WK.............|
00000050  01 00 00 00 01 00 00 00  00 00 00 00 F0 17 00 00   |................|
00000060  00 00 00 00 03 00 00 00  01 00 00 00 F0 17 00 00   |................|
00000070  00 F0 1D 00 00 80 10 80  02 00 00 00 F0 17 00 00   |................|
00000080  F0 07 1E 00 F0 00 00 00  00 00 00 00 00 00 00 00   |................|
00000090  00 00 00 00 00 00 00 00  00 00 00 00 01 00 03 00   |................|
000000A0  00 00 00 00 00 00 00 00  00 00 00 01 04 00 00 00   |................|
000000B0  0E 00 00 00 09 00 00 00  04 00 00 00 04 00 00 00   |................|
000000C0  04 00 00 00 04 00 00 00  00 00 00 00 00 00 00 00   |................|
000000D0  03 00 00 00 06 00 00 00  00 00 00 00 00 00 00 00   |................|
000000E0  00 00 00 00 00 00 00 00  00 00 00 00 00 00 00 00   |................|

:linux:~/t/cardhutz.v8.8.0 $
```

USER INTERFACE WINDOW 500

FIGURE 5

FRAMEWORK FOR MULTI-TYPE AND MULTI-LOCATION FIRMWARE UPDATES AND HARDWARE FEATURE UPDATES THROUGH A SINGLE INTERFACE PROTOCOL

FIELD OF TECHNOLOGY

This disclosure relates generally to firmware update technology, and more particularly, to a method, an apparatus, and/or system of updating a platform system firmware and a component device firmware through a single interface protocol.

BACKGROUND

Firmware may be used during the initialization of a computing or mobile platform to configure and verify the integrity of the platform. A computing or mobile platform (e.g., a smartphone or tablet device) may comprise numerous hardware and/or ancillary components that may each have its own set of firmware. Such firmware may be updated on a periodic basis to improve a component's performance or add new features to the component device.

Each component manufacturer may develop its own individual solution for updating the component's firmware. Moreover, the component manufacturer may develop different solutions for different operating systems and platforms. A platform developer and/or manufacturer may be overburdened by having to learn and/or deploy these differing solutions. The platform developer and/or manufacturer may also have integrity and/or security concerns when firmware updates are written using different protocols. Furthermore, each component manufacturer may release its firmware update at a different time and may inundate the platform developer and/or manufacturer with multiple firmware updates over a short period of time.

Finally, the platform developer and/or manufacturer may irritate the end user of the computing platform or mobile device by pushing too many firmware updates to the computing platform or mobile device's end users. The end user may feel bombarded by a steady stream of firmware updates and may opt to for a different computing platform or mobile device that does not deliver its firmware updates in a piecemeal fashion.

SUMMARY

Disclosed are a method, system, and/or apparatus to enable multi-type and multi-location firmware updates and hardware feature updates through a single interface protocol.

In one aspect, a computer-implemented method of updating a platform system firmware and a component device firmware through a single interface protocol includes assigning a unique index number to each of a platform system and a component device; generating a platform system firmware payload comprising a platform payload header and a system firmware update image; and receiving a component device firmware payload comprising a component firmware update image from a component device manufacturer. Moreover, the method includes generating a firmware update package comprising a package header, the platform system firmware payload, the component device firmware payload, and a component payload header. In this method, the platform system firmware payload comprises the platform payload header having the unique index number assigned to the platform system and the component device firmware payload comprises the component payload header having the unique index number assigned to the component device.

The method may also include querying the platform payload header and the component payload header using a check image application programming interface (API) for a matching unique index number and updating at least one of the platform system firmware and the component device firmware by passing at least one of the platform system firmware payload and the component device firmware payload, respectively, to a set image API.

Under this method, the system firmware update image, the component firmware update image, the check image API, and the set image API may comply with a unified extensible firmware interface (UEFI) standard. The platform system firmware may be a firmware of the platform system stored in a non-volatile memory of the platform system and the component device firmware may be a firmware of the component device coupled to the platform system.

Under this method, the component device firmware may be stored in a storage memory separate from the non-volatile memory storing the platform system firmware and is accessed through a separate bus when updating the component device firmware and the package header may comprise at least one of a platform compatibility data, a package size data, and a package integrity data. Furthermore, the method may include authenticating the firmware update package using at least one of a digital signature and a digital certificate and permitting at least one of a factory update and an over-the-air update to at least one of the platform system firmware and the component device firmware. The method may also include rejecting at least one of the platform payload header and the component payload header if the unique index number does not match when querying the platform payload header and the component payload header using the check image API. Under this method, the firmware update package is generated using a stand-alone application resident on at least one of a Windows® computing device and a Linux® computing device.

In another aspect, a computer-implemented method of updating a plurality of component device firmwares through a single interface protocol includes assigning a unique index number to each of a plurality of component devices coupled to a platform system; receiving a plurality of component device firmware payloads, each comprising a component firmware update image, from a plurality of component device manufacturers; and generating a firmware update package comprising a package header, a plurality of component device firmware payloads, a plurality of component payload headers. Under this method, each of the plurality of component device firmware payloads comprises one of the plurality of component payload headers having the unique index number assigned to each of the plurality of component devices.

This method also includes querying the plurality of component payload headers using a check image application programming interface (API) for a matching unique index number and updating at least one of the plurality of component device firmwares by passing at least one of the plurality of component device firmware payloads to a set image API.

Under this method, each of the plurality of component device firmware is a firmware of each of the plurality of component devices coupled to the platform system. In addition, at least one of the plurality of component device firmwares may be stored in a storage location separate from a storage memory storing at least one other of the plurality of component device firmwares and may be accessed through a separate bus when updating the component device firmware. The package header may comprise at least one of a platform compatibility data, a package size data, and a package integrity data. The method may also include authenticating the firmware update package using at least one of a digital signature and a digital certificate; permitting at least one of a factory update and an over-the-air update to at least one of the plurality of component device firmwares; and rejecting at least one of the plurality of component device firmware payloads if the unique index number does not match when querying the plurality of component payload headers using the check image API.

Under this method, the firmware update package may be generated using a stand-alone application resident on at least one of a Windows® computing device and a Linux® computing device.

In yet another aspect, a computer-implemented method of updating a plurality of hardware features of a platform system through a single interface protocol comprises assigning a unique index number to each of the plurality of hardware features; receiving a plurality of empty payloads, each comprising a feature update command from at least one of a plurality of component device manufacturers; and generating a feature update package comprising a package header, the plurality of empty payloads, and a plurality of feature payload headers. Under this method, each of the plurality of empty payloads comprises one of the plurality of feature payload headers having the unique index number assigned to each of the plurality of hardware features.

The method also includes querying the plurality of empty payloads using a check image application programming interface (API) for a matching unique index number; and updating at least one of the plurality of hardware features by passing at least one of the plurality of empty payloads comprising the feature update command to a set image API. Under this method, the check image API and the set image API comply with a unified extensible firmware interface (UEFI) standard.

The methods, system, and/or apparatuses disclosed herein may be implemented in any means for achieving various aspects, and may be executed in a form of machine readable medium embodying a set of instruction that, when executed by a machine, causes the machine to perform any of the operations disclosed herein. Other features will be apparent from the accompanying drawing and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5 is a user interface view of the contents of a package header denoting the firmware update package generated in accordance with the single interface protocol of FIG. 1, according to one embodiment.

Other features of the present embodiments will be apparent from the accompanying drawings and from the detailed description that follows.

DETAILED DESCRIPTION

Disclosed are a method, system, and/or apparatus to enable multi-type and multi-location firmware updates and hardware feature updates through a single interface protocol.

In one embodiment, the single interface protocol is a new framework for effecting updates for firmware based on a Unified Extensible Firmware Interface (UEFI) standard. In this embodiment, the single interface protocol permits a platform system manufacturer and/or platform system developer to update any of: (a) a platform system firmware and a component device firmware; (b) a platform system firmware and a plurality of component device firmwares; and (c) a plurality of platform system firmwares and a plurality of component device firmwares through the single interface protocol. The single interface protocol may be built on top of a standard UEFI protocol, such as an EFI_FIRMWARE_MANAGEMENT_PROTOCOL. Using the method, system, and/or apparatus described in these embodiments, a platform system manufacturer and/or an end user of a platform system device is able to update firmwares in any of the aforementioned scenarios without having to adopt a multitude of proprietary interface protocols promulgated by the component device manufacturers and/or vendors.

Figure 1:
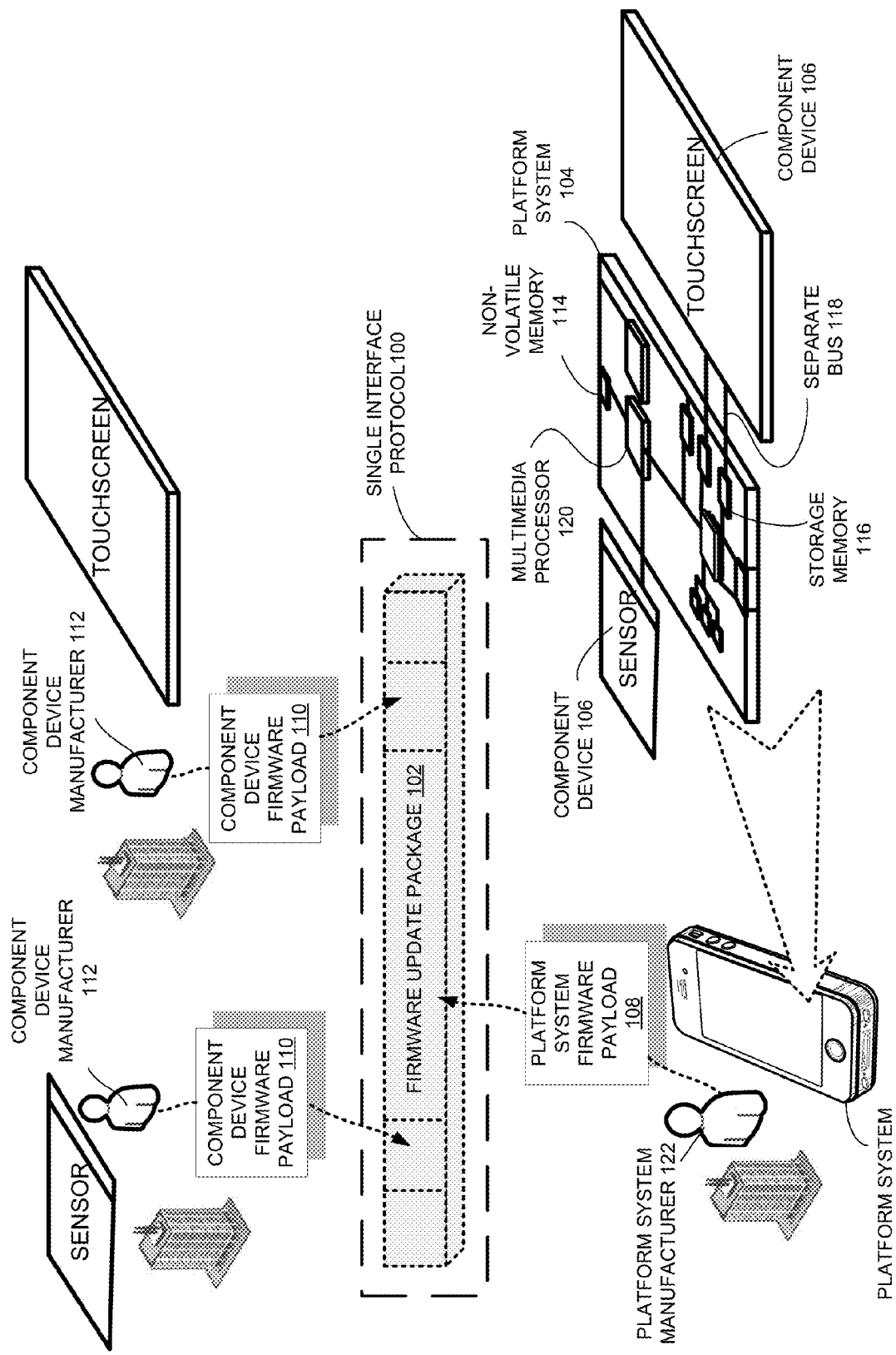
FIG. 1 is a schematic overview diagram of a single interface protocol receiving several component firmware updates from several component device manufacturers, according to one embodiment.

Reference is now made to FIG. 1, which is a schematic overview diagram of a single interface protocol 100 providing a framework for receiving several component firmware updates in the form of component device firmware payloads 110 from several component device manufacturers 112, according to one embodiment. In one embodiment, the rules and instructions established by the single interface protocol 100 are used by a platform system manufacturer 122 to update the firmwares of a plurality of component devices 106 coupled to a platform system 104. In one embodiment, the platform system 104 may be a platform of a multi-core processor (e.g., NVIDIA's® Tegra® 3 Quad-Core processor or Tegra® 2 Dual-Core processor) resident in a platform system device 124 (e.g., a mobile device, a smartphone, a tablet device, a computing device, etc.).

In this embodiment, the platform system manufacturer 122 generates a firmware update package 102 comprising a platform system firmware payload 108 and at least one component device firmware payload 110. In most such cases, the firmware update package 102 is generated with a plurality of component device firmware payloads 110 and at least one platform system firmware payload 108.

In one exemplary embodiment, the platform system 104 may be a platform of a system-on-a-chip (e.g., NVIDIA's® Tegra® 3 Quad-Core processor) of a mobile device and the component devices 106 in need of firmware updates may include a sensor and a touchscreen. In this embodiment, one of the component device manufacturers 112 may be the manufacturer of the sensor component and the other component device manufacturer 112 may be the manufacturer of the touchscreen component. In the aforementioned description, however, one skilled in the relevant art will recognize that a "manufacturer" may refer to any one of a vendor, a software developer, and/or a designer working under the auspices of the manufacturer or in conjunction with the manufacturer. In this exemplary embodiment, the platform system firmware of the platform system 104 is stored in a non-volatile memory 114 coupled to a multimedia processor 102. In this same exemplary embodiment, a component device firmware of the sensor component device is stored in the same non-volatile memory 114 and a component device firmware of the touchscreen component device is stored in a storage memory 116 separate from the non-volatile memory 114 and is accessed by the touchscreen component device through a separate bus 118.

Figure 2A:
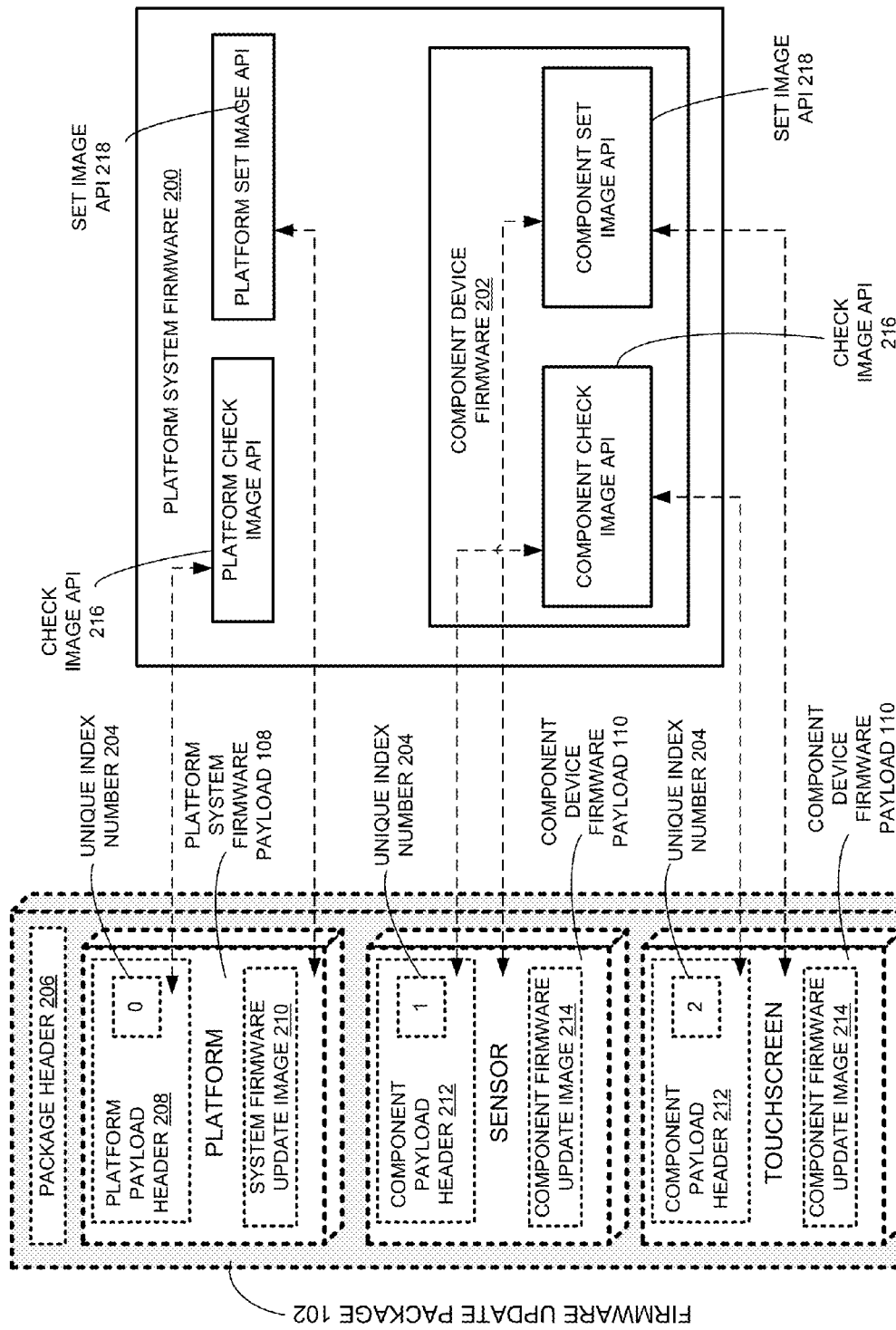
FIG. 2A is a schematic block diagram of the firmware update package of FIG. 1 used to update a platform system firmware and a plurality of component device firmwares, according to one embodiment.

Reference is now made to FIG. 2A, which is a schematic block diagram of the firmware update package 102 of FIG. 1 created to update a platform system firmware 200 and a plurality of component device firmwares 202, according to one embodiment. In the following description, one skilled in the art of firmware updates will recognize that the following method, system, and apparatus can be used to update any combination of platform and component device firmwares, including, but not limited to, one platform system firmware and one component device firmware and a plurality of platform system firmwares and a plurality of component device firmwares. Additionally, the word "plurality" may refer to any number of objects, elements, and/or devices in excess of one.

FIG. 2A illustrates one exemplary embodiment of a computer-implemented method of updating a platform system firmware 202 and a plurality of component device firmwares 202 using the framework provided by the single interface protocol 100 of FIG. 1. In this exemplary embodiment, the method includes assigning a unique index number 204 to each of the platform system 104 and the component devices 106. The platform system firmware 200 is a firmware of the platform system 104 and may be stored in non-volatile memory of the platform system 104 such as an embedded multimedia card (eMMC). The platform system firmware 200 may also include a firmware to boot up the platform system 104. As depicted in FIG. 2A, one of the plurality of component devices 106 may be a sensor (such as a thermal sensor) of the platform system 104 and one of the plurality of component devices 106 may be a touchscreen of the platform system 104.

The unique index number 204 may be a singular number, a row number, a column number, and/or a combination of row and column numbers. The platform system manufacturer 122 may also reserve certain ranges of numbers for the unique index number 204. In one exemplary embodiment, the platform system manufacturer 122 may reserve the numbers 0x1F for platform system features in need of firmware updates and the numbers 0x20 to 0xFF for component devices in need of firmware updates. While the unique index numbers 204 assigned to a plurality of component device 106 may differ from one component device to another component device, a component device 106 retains its unique index number 204 for that particular platform system 104. However, a component device 106 may receive a different unique index number 204 when such a component device is used in a different platform system 104. For example, a touchscreen component device may receive a unique index number 0020 when the touchscreen component device is used in a smartphone platform developed by Manufacturer X, the same touchscreen component device may receive a different unique index number of 0030 when the touchscreen component device is used in a smartphone platform developed by Manufacturer Y.

The method further includes generating a platform system firmware payload 108 comprising a platform payload header 208 and a system firmware update image 210. The platform system firmware payload 108 may be written in accordance with the UEFI standard and both the platform payload header 208 and the system firmware update image 210 may be implemented in accordance with the UEFI standard. The platform payload header 208 may contain the unique index number 204 specifically assigned to the platform system 104.

In accordance with this method, the platform system manufacturer may receive a plurality of component device firmware payloads 110, each comprising a component firmware update image 214 and a component payload header 212 from a plurality of component device manufacturers 112. Moreover, the method includes generating the firmware update package 102 comprising a package header 206, the platform system firmware payload 108, and a plurality of component device firmware payloads 110. In certain embodiments, the firmware update package 102 may also contain a digital certificate 220 to authenticate the firmware update package 102.

The digital certificate 220 may be a digital signature or key that identifies the sender of a digital package or set of data as the true and verified sender. In one embodiment, the creator of the firmware update package 102 may encrypt a portion of the firmware update package 102 with the creator's private key. The creator may then reveal certain information regarding this private key to an intended recipient of the firmware update package 102. A platform system manufacturer and/or developer may then decrypt this digital certificate, and, thereby verify the authenticity of the accompanying firmware update package 102, by using the information provided by the creator of the firmware update package 102. One example of the digital signature 220 is a digital signature that abides by the Digital Signature Standard (DSS).

In one embodiment, the firmware update package 102 may be generated using a stand-alone application compatible with at least one of a Windows® computing device and a Linux® computing device. In this embodiment, the platform system manufacturer 122 may run the stand-alone application to generate the firmware update package 102 to be sent to a platform system 104 through a wired and/or wireless connection. The instructions for the stand-alone application may be stored in a non-transitory medium of a computing device running either a Windows® or a Linux® operating system, and may read the instructions using a data processing device resident on the computing device.

Finally, the method includes querying the platform payload header 208 and the plurality of component payload headers 212 using a check image application programming interface (API) 216 for a matching unique index number and updating at least one of the platform system firmware 200 and the plurality of component device firmwares 202 by passing at least one of the platform system firmware payload 108 and the plurality of component device firmware payloads 110, respectively, to a set image API 218.

As illustrated in FIG. 2A, in one exemplary embodiment, the platform payload header 208 is passed as a parameter to a platform check image API. The platform check image API will call a check image function (e.g. CheckImage( )) to see if the unique index number 204 assigned to the platform system 104 matches that of the unique index number 204 contained in the platform payload header 208. In this exemplary embodiment, a matching unique index number 204 results in a statement of EFI_SUCCESS and/or IMAGE_UPDATABLE_VALID. In this case, the platform system firmware payload 108 comprising the system firmware update image 210 is passed as a parameter to the platform set image API. In this embodiment, the set image API 218 (in this case, the platform set image API) may update the platform system firmware 200 by re-writing over the existing firmware code stored in the non-volatile memory 114. The platform set image API may also update the platform system firmware 200 by flashing the system firmware update image 210. Both the platform check image API and the platform set image API may be written into the code of the platform system firmware 200.

Also illustrated in FIG. 2A, a plurality of component payload headers 212 are passed as parameters to a component check image API. In this embodiment, the component check image API will call a check image function to see if the unique index number 204 assigned to the particular component device 106 matches that of the unique index number 204 contained in the component payload header 212. The check image API 216 may reject a particular component payload header 212 queried if the unique index number 204 assigned to the particular component device 106 does not match the unique index number 204 contained in the component payload header 212. If the check image function returns a result of EFI_SUCCESS and/or IMAGE_UPDATABLE_VALID as a result of a matching unique index number 204, the entire component device firmware payload 110 is then passed to a component set image API. The component set image API may then update the component system firmware 202 by re-writing over the existing component device firmware 202 stored in either the non-volatile memory 114 or a storage memory 116 separate from the non-volatile memory 114. The component set image API may also update the component device firmware 202 by flashing the component firmware update image 214. Both the component check image API and the component set image API may be written into the code of the component device firmware 202.

In one embodiment, the component device firmware 202 may be embedded in the platform system firmware 200. In another embodiment (not shown in FIG. 2A), the component device firmware 202 may be stored in the storage memory 116 separate from the non-volatile memory 114. In this case, the component set image API may provide a direct pointer to the storage memory 116 (accessible through the separate bus 118) and may update the component device firmware 202 by flashing the component firmware update image 214 to the storage memory 116 through the separate bus 118. A get image function (e.g., GetImage( )) may also be used to fetch a firmware update from a separate location.

In the methods described herein, the system firmware update image 210, the component firmware update image 214, the check image APIs 216, and the set image APIs 218 may comply with UEFI specifications. As indicated above, the single interface protocol 100 may be built on top of a standard UEFI protocol, such as an EFI_FIRMWARE_MANAGEMENT_PROTOCOL. In one embodiment, the single interface protocol 100 is the NV_FW_UPDATE_PROTOCOL and is a set of instructions stored in the non-volatile memory 114 (e.g., an embedded multimedia card) of the platform system 104.

Figure 2B:
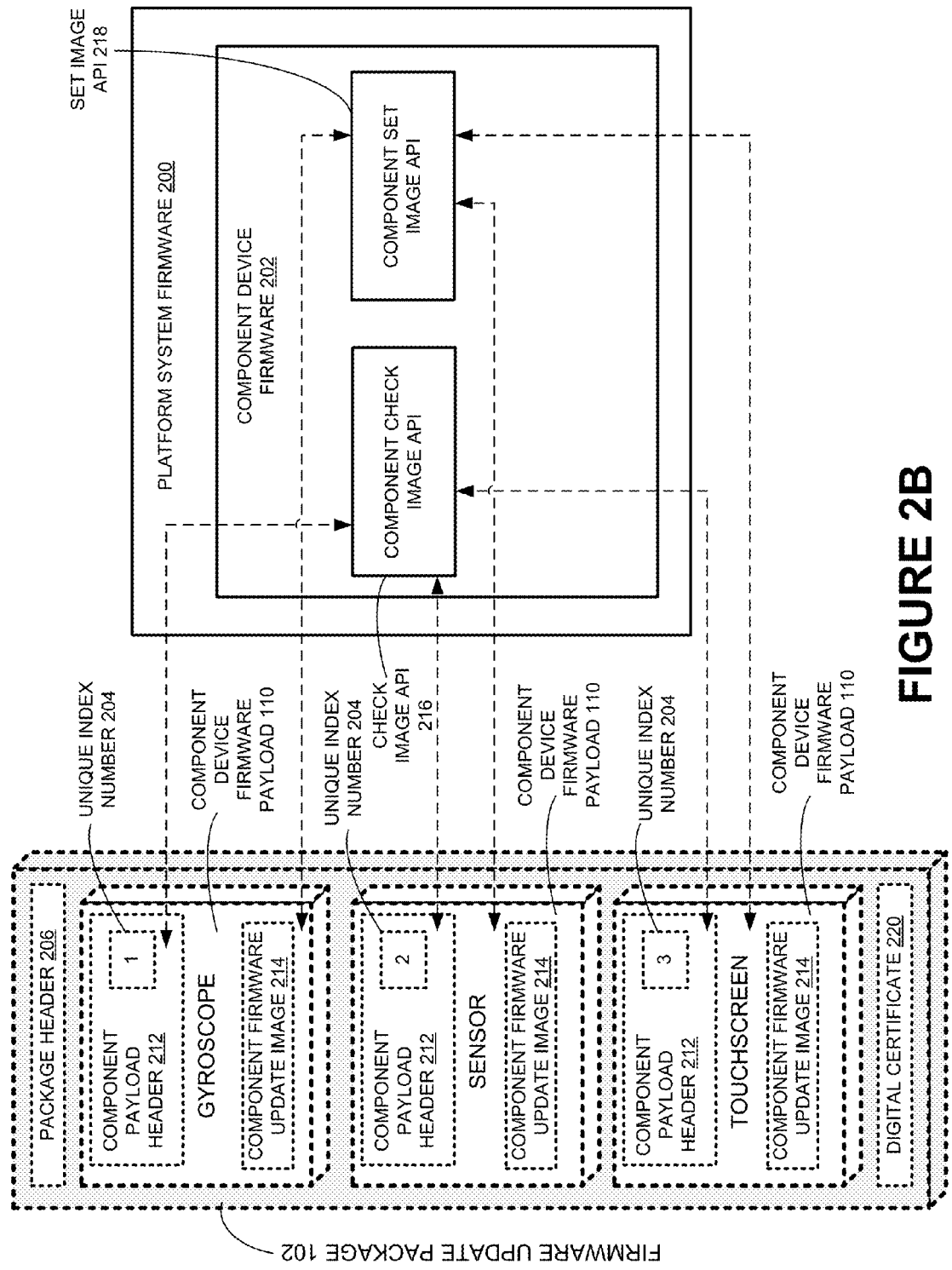
FIG. 2B is a schematic block diagram of the firmware update package of FIG. 1 used to update a plurality of component device firmwares, according to one embodiment.

Reference is now made to FIG. 2B, which is a schematic block diagram of the firmware update package of FIG. 1 used to update a plurality of component device firmwares, according to one embodiment. As illustrated in FIG. 2B, a plurality of component payload headers 212 are passed as parameters to a component check image API. In this embodiment, the component check image API will call a check image function to see if the unique index number 204 assigned to the particular component device 106 matches that of the unique index number 204 contained in the component payload header 212. The check image API 216 may reject a particular component payload header 212 queried if the unique index number 204 assigned to the particular component device 106 does not match the unique index number 204 contained in the component payload header 212. If the check image function returns a result of EFI_SUCCESS and/or IMAGE_UPDATABLE_VALID as a result of a matching unique index number 204, the entire component device firmware payload 110 is then passed to a component set image API.

The component set image API may then update the component system firmware 202 by re-writing over the existing component device firmware 202 stored in either the non-volatile memory 114 or a storage memory 116 separate from the non-volatile memory 114. The component set image API may also update the component device firmware 202 by flashing the component firmware update image 214. Both the component check image API and the component set image API may be written into the code of the component device firmware 202.

In one embodiment, the component device firmware 202 may be embedded in the platform system firmware 200. In another embodiment (not shown in FIG. 2B), the component device firmware 202 may be stored in the storage memory 116 separate from the non-volatile memory 114. In this case, the component set image API may provide a direct pointer to the storage memory 116 (accessible through the separate bus 118) and may update the component device firmware 202 by flashing the component firmware update image 214 to the storage memory 116 through the separate bus 118. A get image function (e.g., GetImage( )) may also be used to fetch a firmware update from a separate location.

Finally, the single interface protocol 100 may permit at least one of a factory update and an over-the-air (OTA) update to at least one of the platform system firmware 200 and the component device firmware 202. While the currently established EFI_FIRMWARE_MANAGEMENT_PROTOCOL supports over-the-air updates for platform system firmware updates, the protocol does not support over-the-air updates for component device firmware updates. In this instance, an over-the-air update refers to a firmware update delivered to a platform system over a network (e.g., the Internet) and when an operating system and a platform system firmware have been installed on the platform system device. Moreover, a factory update refers to a firmware update delivered to a platform system without an operating system or a firmware platform system firmware installed on the platform system device. The single interface protocol 100 may permit either an OTA update or a factory update through specially designed APIs supporting such updates.

In the exemplary embodiment shown in FIG. 2B, the plurality of component devices 106 in need of firmware updates include a gyroscope, a sensor (such as a thermal sensor), and a touchscreen. In this embodiment, the component check image API iteratively checks the plurality of component payload headers 212 until the check image function returns a result of EFI_SUCCESS or IMAGE_UPDATABLE_VALID. Such a result may be achieved when a component check image API matches the unique index number 204 assigned to the component device 106 with the unique index number 204 embedded in the component payload header 212. When a match is not found, the component check image API will load another component payload header 212 until all component payload headers 212 have been queried.

If the check image function returns a result of EFI_SUCCESS, the single interface protocol 100 then passes the entire component device firmware payload 110 as an input to the component set image API. The component set image API may then update the component system firmware 202 by re-writing over the existing component device firmware 202. For example, the component set image API may update the firmware of the touchscreen device by re-writing the component firmware code of the touchscreen device stored in the storage memory 116 separate from the non-volatile memory 114 and accessed through the separate bus 118.

Figure 2C:
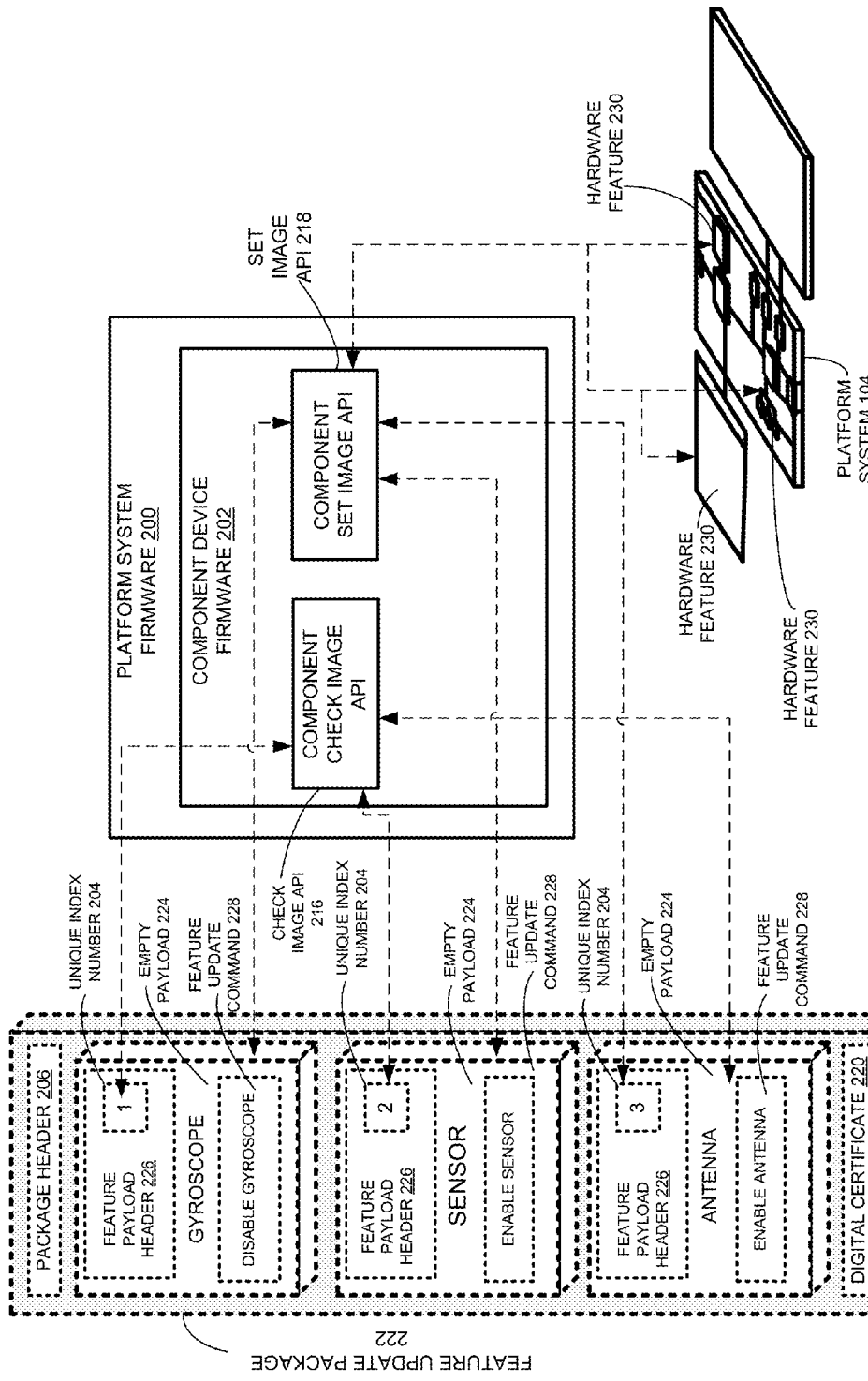
FIG. 2C is a schematic block diagram of the firmware update package of FIG. 1 used to update a plurality of hardware features, according to one embodiment.

Reference is now made to FIG. 2C, which is a schematic block diagram of the firmware update package of FIG. 1 used to update a plurality of hardware features, according to one embodiment. FIG. 2C illustrates one exemplary embodiment of a computer-implemented method of updating a plurality of hardware features 230 using the framework provided by the single interface protocol 100 of FIG. 1. In this exemplary embodiment, the method includes assigning a unique index number 204 to each of the plurality of hardware features 230. As depicted in FIG. 2C, the platform system firmware 200 is a firmware of the platform system 104 and may be stored in a non-volatile memory of the platform system 104 such as an embedded multimedia card (eMMC). As seen in FIG. 2C, the plurality of hardware features 230 may include a gyroscope feature, a sensor feature, and an antenna feature of the platform system 104. In one or more other embodiments, the plurality of hardware features 230 may include fuses and/or security keys.

Similar to the methods described heretofore, the unique index number 204 may be a singular number, a row number, a column number, and/or a combination of row and column numbers. In accordance with this method, the platform system manufacturer 122 receives a plurality of empty payloads 224, each comprising a feature update command 228 from a plurality of component device manufacturers 112. Moreover, the method includes generating a feature update package 222 comprising a package header 206, the plurality of empty payloads 224, and a plurality of feature payload headers 226. In this embodiment, each of the plurality of empty payloads 224 contains one of the plurality of feature payload headers 226 having the unique index number assigned to each of the plurality of hardware features 230.

Finally, the method includes querying the plurality of empty payloads 224 using a check image application programming interface (API) 216 for a matching unique index number and updating at least one of the plurality of hardware features 230 by passing at least one of the plurality of empty payloads 224 comprising the feature update command 228 to a set image API 218.

In certain embodiments, the feature update package 222 may also contain a digital certificate 220 to authenticate the feature update package 222. In one embodiment, the feature update package 22 may be generated using a stand-alone application compatible with at least one of a Windows® computing device and a Linux® computing device. In this embodiment, the platform system manufacturer 122 may run the stand-alone application to generate the feature update package 222 to be sent to a platform system 104 through a wired and/or wireless connection. The instructions for the stand-alone application may be stored in a non-transitory medium of a computing device running either a Windows® or a Linux® operating system, and may read the instructions using a data processing device resident on the computing device.

As illustrated in FIG. 2C, a plurality of feature payload headers 226 are passed as parameters to a component check image API. In this embodiment, the component check image API will call a check image function to see if the unique index number 204 assigned to the hardware feature 230 matches that of the unique index number 204 contained in the feature payload header 226. The check image API 216 may reject a particular feature payload header 226 queried if the unique index number 204 assigned to the particular hardware feature 230 does not match the unique index number 204 contained in the feature payload header 226. If the check image function returns a result of EFI_SUCCESS and/or IMAGE_UPDATABLE_VALID as a result of a matching unique index number 204, the entire empty payload 225 is then passed to a component set image API. The component set image API may then update the hardware feature 230 by enacting the feature update command 228 contained in the empty payload 224.

As seen in FIG. 2C, the feature update command 228 may comprise of a command to enable an antenna (e.g., an antenna used to receive 4G wireless signals). The feature update command 228 may act as a switch that turns on or off the hardware feature 230 and the set image API 218 may direct the feature update command 228 to its intended hardware feature 230 through the appropriate interface buses. In one embodiment, the component device firmware 202 may be embedded in the platform system firmware 200. In another embodiment (not shown in FIG. 2A), the component device firmware 202 may be stored in the storage memory 116 separate from the non-volatile memory 114.

In the methods described herein, the check image APIs 216, and the set image APIs 218 may comply with applicable UEFI specifications. In addition, under the method described herein, no separate drivers are required to effect the hardware feature changes. As indicated above, the single interface protocol 100 may be built on top of a standard UEFI protocol, such as an EFI_FIRMWARE_MANAGEMENT_PROTOCOL. In one embodiment, the single interface protocol 100 is the NV_FW_UPDATE_PROTOCOL and is a set of instructions stored in the non-volatile memory 114 (e.g., an embedded multimedia card) of the platform system 104. With respect to hardware feature updates, the methods described herein leverages the EFI_FIRMWARE_MANAGEMENT_PROTOCOL's rules pertaining to empty payloads.

Figure 3:
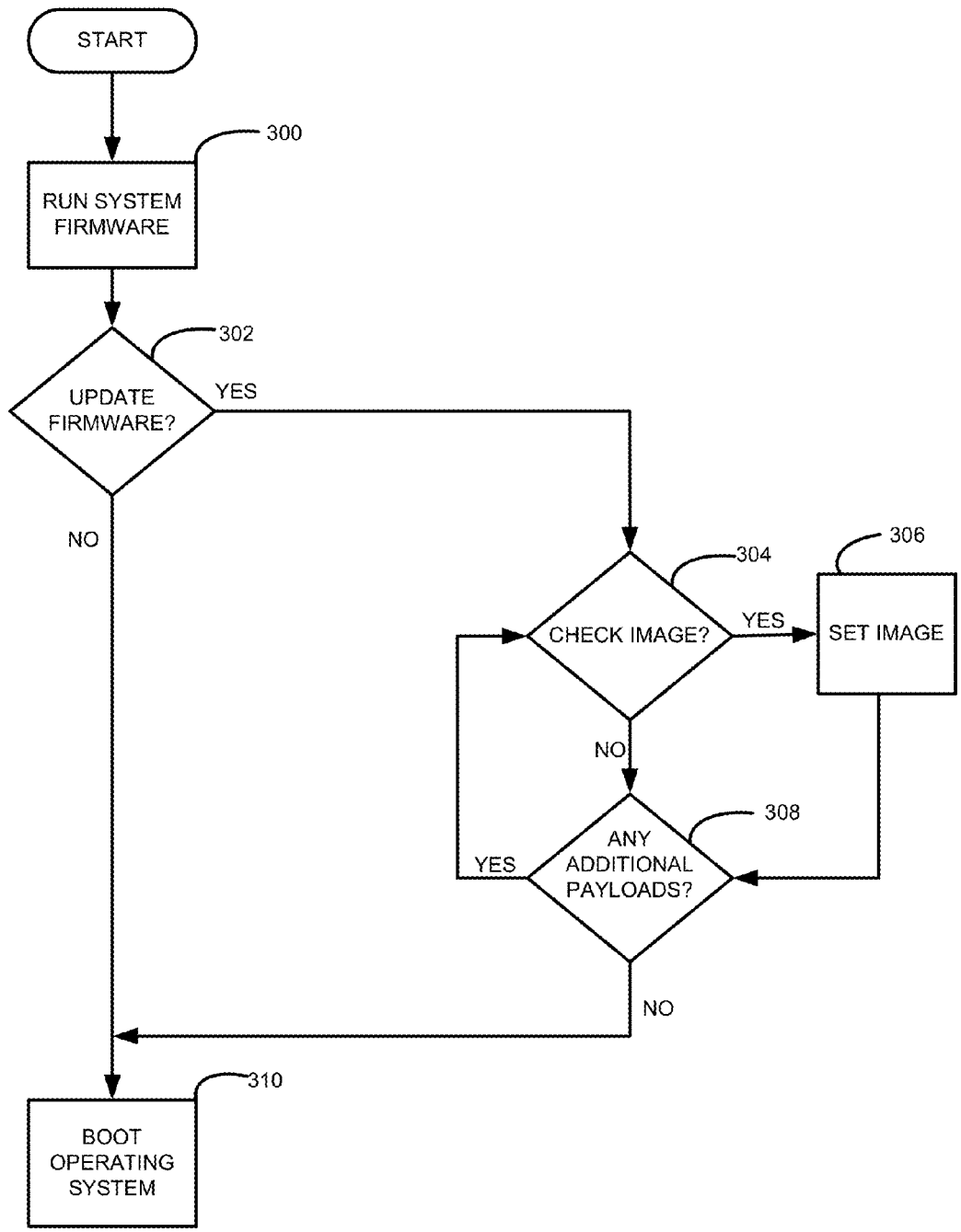
FIG. 3 is a flowchart illustrating when in the initialization process the single interface protocol of FIG. 1 would operate, according to one embodiment.

Reference is now made to FIG. 3, which is a flowchart illustrating when in the initialization process the single interface protocol of FIG. 1 would operate from the perspective of platform system device 124, according to one embodiment. As can be seen in FIG. 3, operation 300 starts the initialization process as soon as a cold boot is initiated. In one embodiment, operation 300 involves activating the platform system firmware 200. After the platform system firmware 200 is activated, a decision 302 is made as to whether a firmware update is required. The receipt of a firmware update package 102 may result in an answer of "Yes," which may then lead the platform system 104 to begin iteratively querying the payload headers of the firmware update package 102 using the check image API 216. If the result of the check image query 304 is a "No," then the platform system firmware 200 will ask whether any additional payloads are included in the firmware update package 102. If, however, the check image query 304 returns a result of EFI_SUCCESS or IMAGE_UPDATABLE_VALID (i.e., "Yes"), the protocol will pass the entire payload as a parameter to the set image function. After the set image operation 306, the platform system firmware 200 will ask whether any additional payloads remain. If the result of the any additional payloads query 308 is a "No," then the platform system firmware 200 will proceed to boot the operating system. If the result of the query is a "Yes," then the protocol dictates that the check image function be applied to the next payload.

Figure 4:
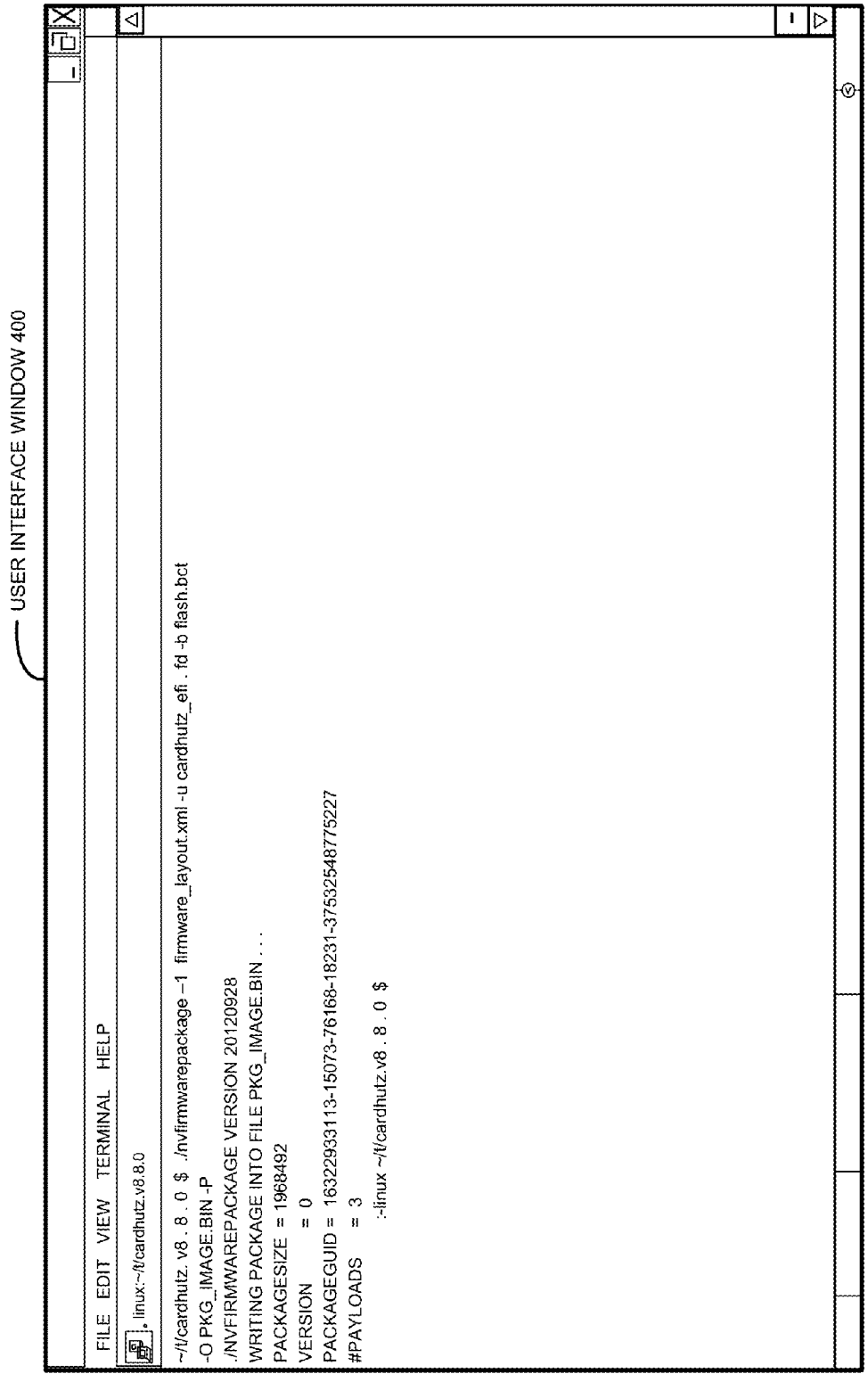
FIG. 4 is a user interface view of a firmware update package being generated in accordance with the single interface protocol of FIG. 1, according to one embodiment.

Reference is now made to FIG. 4, which is a user interface view of the interface protocol of FIG. 1 generating a firmware update package 200, according to one embodiment. As shown in FIG. 4, user interface window 400 shows the user interface used by a platform system manufacturer 122 or a platform system developer to generate the firmware update package 200. As can be seen in FIG. 4, information regarding the number of payloads in the firmware update package 102, the size of the package, and the version of the package are displayed.

Reference is now made to FIG. 5, which shows a user interface window 500 displaying the contents of the package header 206 generated according to the framework of interface protocol 100. As can be seen in FIG. 5, the package header 206 contains machine-readable data concerning the number of payloads, the size of the firmware update package 102, the version of the firmware update package 102, and/or the integrity of the firmware update package 102, according to one embodiment.

Figure 6:
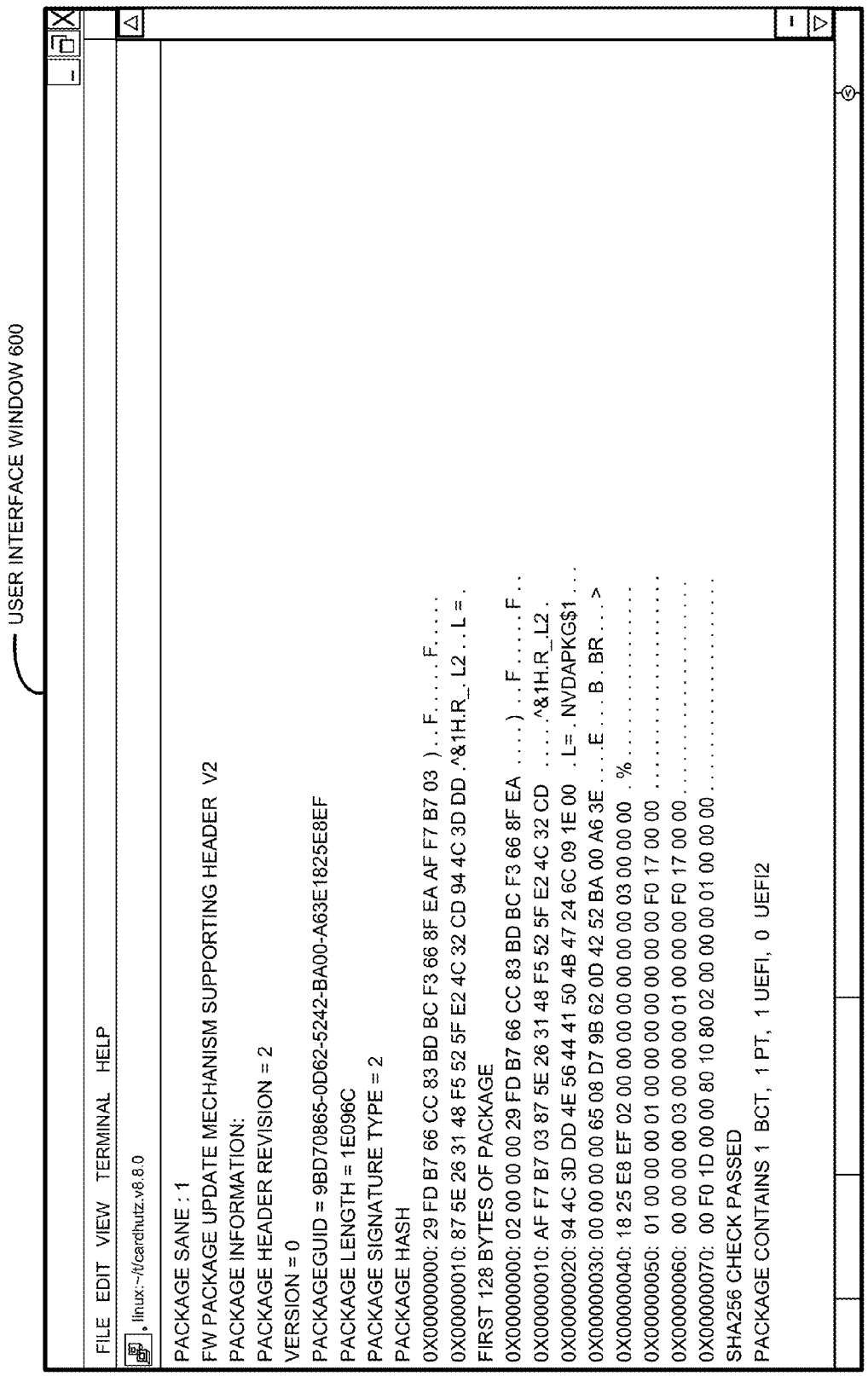
FIG. 6 is a user interface view of updates to a platform system firmware and a component device firmware made through the single interface protocol of FIG. 1, according to one embodiment.

Reference is now made to FIG. 6, which shows a user interface window 600 denoting the progress of a platform system firmware update and a plurality of component device firmware updates, according to one embodiment. As can be seen in FIG. 6, no firmware updates can take place until after the check image function has undergone its query.

Figure 7:
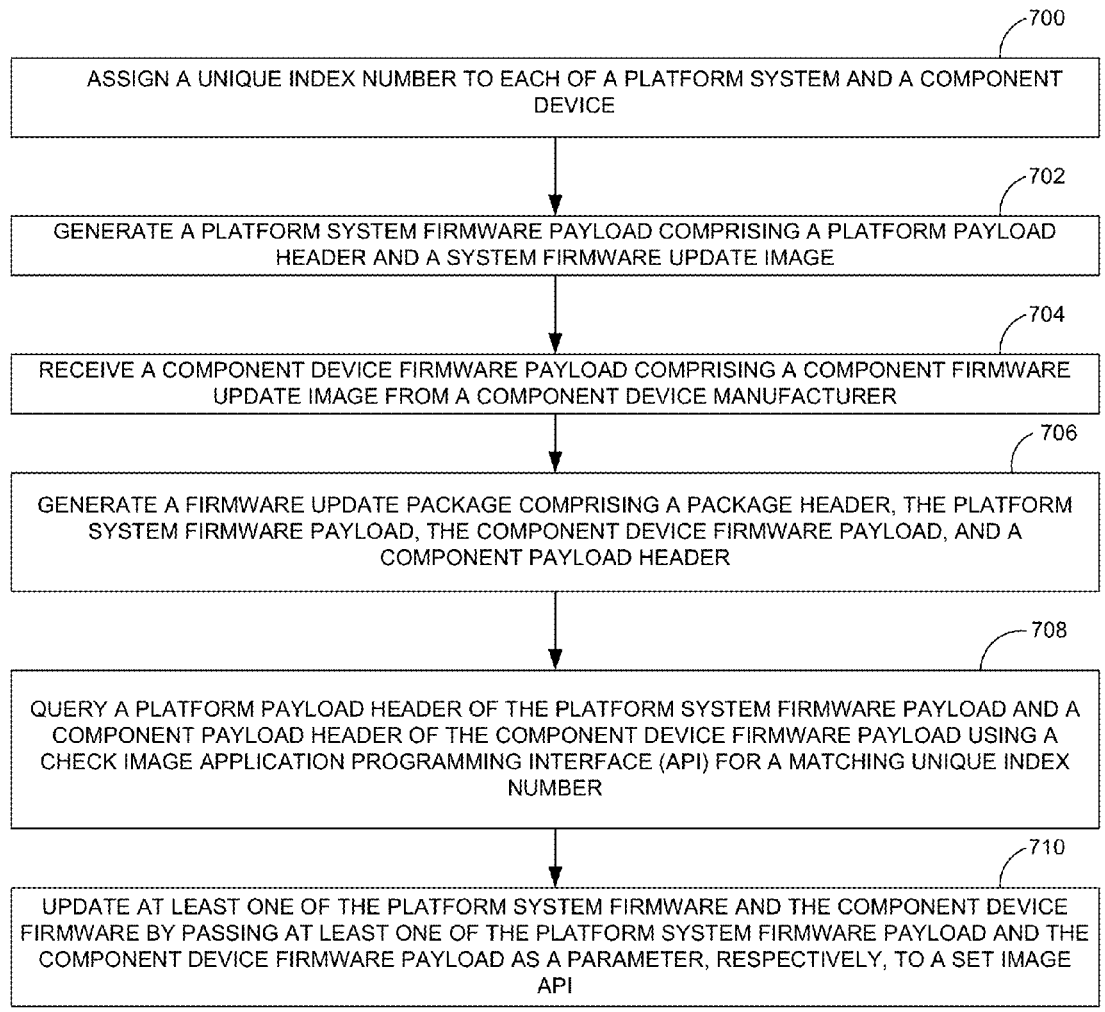
FIG. 7 is a process flowchart illustrating the method of updating a platform system firmware and a component device firmware through the single interface protocol of FIG. 1, according to one embodiment.

Reference is now made to FIG. 7, which shows a process flowchart depicting the method of updating a platform system firmware and a component device firmware through the single interface protocol of FIG. 1, according to one embodiment. In one or more embodiments, operation 700 may involve assigning a unique index number 204 to each of a platform system 104 and a component device 106. In addition, operation 702 may involve generating a platform system firmware payload 108 comprising a platform payload header 208 and a system firmware update image 210. Furthermore, operation 704 may involve receiving a component device firmware payload 110 comprising a component firmware update image 214 from a component device manufacturer 112. In addition, operation 706 may involve generating a firmware update package 102 comprising a package header 206, the platform system firmware payload 108, the component device firmware payload 110, and a component payload header 208. The method may also include operation 708 which involves querying a platform payload header 208 of the platform system firmware payload 108 and a component payload header 212 of the component device firmware payload 110 using a check image API 116 for a matching unique index number. Finally, operation 710 may involve updating at least one of the platform system firmware 200 and the component device firmware 202 by passing at least one of the platform system firmware payload 108 and the component device firmware payload 110, respectively, to a set image API 218.

Figure 8:
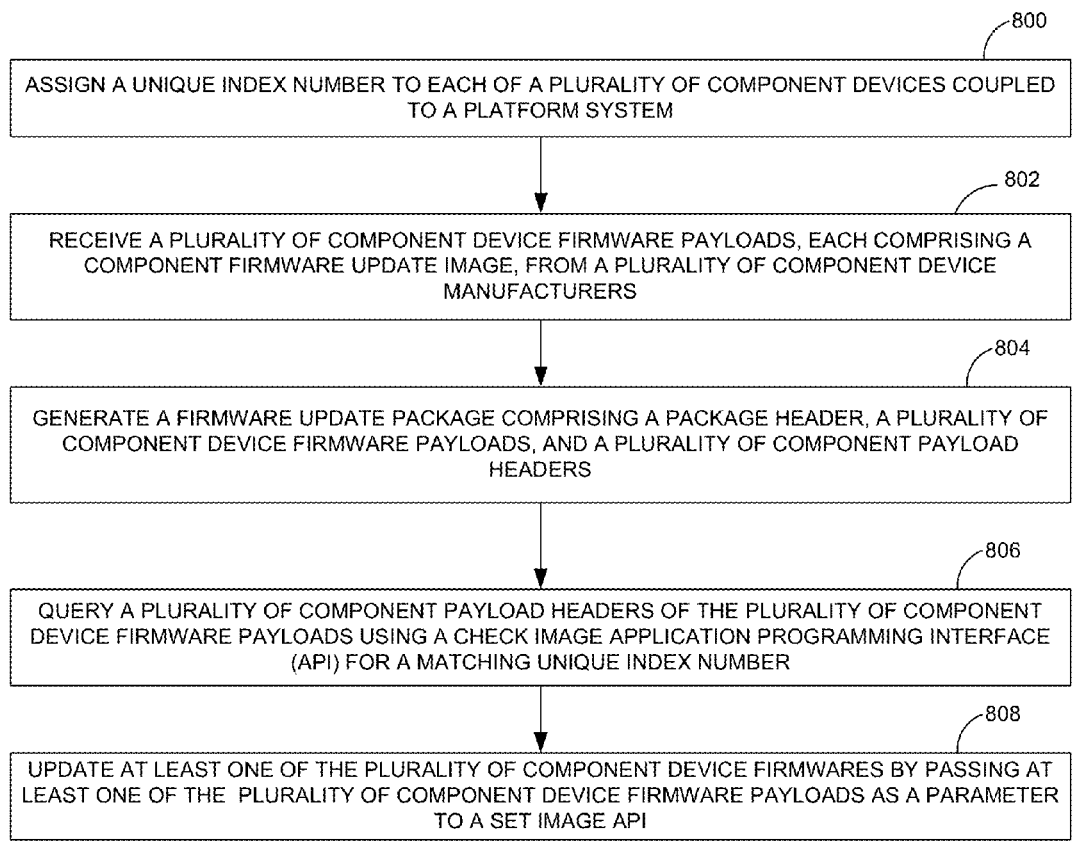
FIG. 8 is a process flowchart illustrating the method of updating a plurality of component device firmwares through the single interface protocol of FIG. 1, according to one embodiment.

Reference is now made to FIG. 8, which shows a process flowchart illustrating the method of updating a plurality of component device firmwares through the single interface protocol of FIG. 1, according to one embodiment. In one or more embodiments, operation 800 may involve assigning a unique index number 204 to each of a plurality of component devices 106 coupled to a platform system 104. In addition, operation 802 may involve receiving a plurality of component device firmware payloads 110, each comprising a component firmware update image 214 from a plurality of component device manufacturers 112. In addition, operation 804 may involve generating a firmware update package 102 comprising a package header 206, a plurality of component device firmware payloads 110, and a plurality of component payload headers 212. The method may also include operation 806 which involves querying a plurality of component payload headers 212 of the plurality of component device firmware payloads 110 using a check image API 216 for a matching unique index number. Finally, operation 808 may involve updating at least one of the plurality of component device firmwares 202 by passing at least one of the plurality of component device firmware payloads 110, respectively, to a set image API 218.

Figure 9:
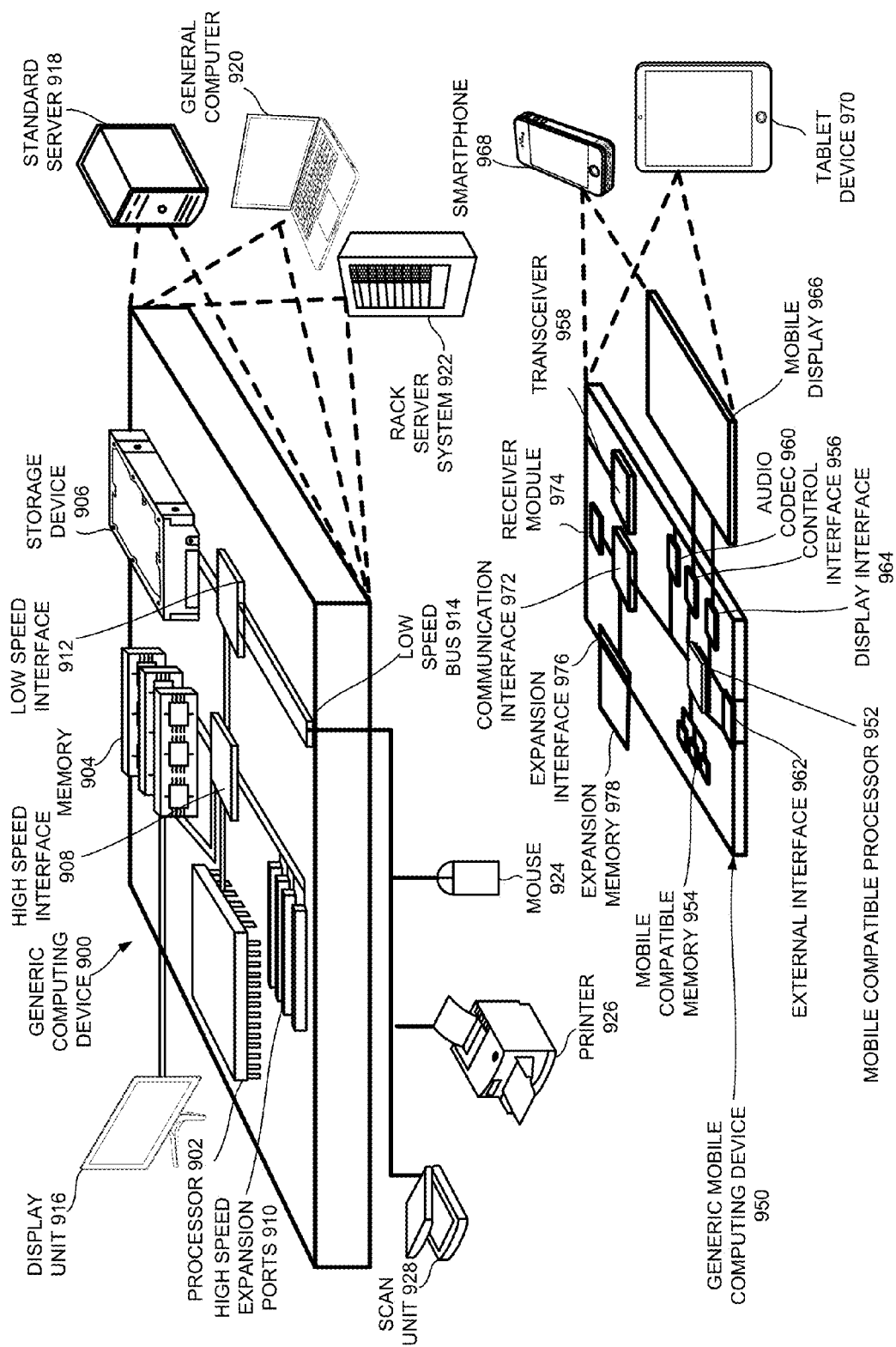
FIG. 9 is a schematic of a generic computing device and a generic mobile computing device that can be used to perform and/or implement any of the embodiments disclosed herein.

FIG. 9 is a schematic of a generic computing device 900 and a generic mobile computing device 950 that can be used to perform and/or implement any of the embodiments disclosed herein. In one embodiment, the platform system device 124 comprises certain of the features of the generic mobile computing device 950. In another embodiment, the platform system device 124 comprises certain of the features of the generic computing device 900.

The generic computing device 900 may represent various forms of digital computers, such as laptops, desktops, workstations, personal digital assistants, servers, blade servers, mainframes, and/or other appropriate computers. The generic mobile computing device 950 may represent various forms of mobile devices, such as smartphones, camera phones, personal digital assistants, cellular telephones, and other similar generic mobile computing devices. The components shown here, their connections, couples, and relationships, and their functions, are meant to be exemplary only, and are not meant to limit the embodiments described and/or claimed.

The generic computing device 900 may include a processor 902, a memory 904, a storage device 906, a high speed interface 908 coupled to the memory 904 and a plurality of high speed expansion ports 910, and a low speed interface 912 coupled to a low speed bus 914 and a storage device 906. In one embodiment, each of the components heretofore may be inter-coupled using various buses, and may be mounted on a common motherboard and/or in other manners as appropriate. The processor 902 may process instructions for execution in the generic computing device 900, including instructions stored in the memory 904 and/or on the storage device 906 to display a graphical information for a GUI on an external input/output device, such as a display unit 916 coupled to the high speed interface 908. In other embodiments, multiple processors and/or multiple buses may be used, as appropriate, along with multiple memories and/or types of memory. Also, a plurality of generic computing devices 900 may be coupled with, with each device providing portions of the necessary operations (e.g., as a server bank, a group of blade servers, and/or a multi-processor system).

The memory 904 may be coupled to the generic computing device 900. In one embodiment, the memory 904 may be a volatile memory. In another embodiment, the memory 904 may be a non-volatile memory. The memory 904 may also be another form of computer-readable medium, such as a magnetic and/or an optical disk. The storage device 906 may be capable of providing mass storage for the generic computing device 900. In one embodiment, the storage device 906 may be comprised of at least one of a floppy disk device, a hard disk device, an optical disk device, a tape device, a flash memory and/or other similar solid state memory device. In another embodiment, the storage device 906 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in at least one of the memory 904, the storage device 906, a memory coupled to the processor 902, and/or a propagated signal.

The high speed interface 908 may manage bandwidth-intensive operations for the generic computing device 900, while the low speed interface 912 may manage lower bandwidth-intensive operations. Such allocation of functions is exemplary only. In one embodiment, the high-speed interface 908 may be coupled to at least one of the memory 904, the display unit 916 (e.g., through a graphics processor and/or an accelerator), and to the plurality of high speed expansion ports 910, which may accept various expansion cards. In the embodiment, the low speed interface 912 may be coupled to at least one of the storage device 906 and the low-speed bus 914. The low speed bus 914 may be comprised of a wired and/or wireless communication port (e.g., a Universal Serial Bus ("USB"), a Bluetooth® port, an Ethernet port, and/or a wireless Ethernet port). The low speed bus 914 may also be coupled to at least one of scan unit 928, a printer 926, a keyboard, a mouse 924, and a networking device (e.g., a switch and/or a router) through a network adapter.

The generic computing device 900 may be implemented in a number of different forms, as shown in the figure. In one embodiment, the generic computing device 900 may be implemented as a standard server 920 and/or a group of such servers. In another embodiment, the generic computing device 900 may be implemented as part of a rack server system 922. In yet another embodiment, the generic computing device 900 may be implemented as a general computer 920 such as a laptop computer. Alternatively, a component from the generic computing device 900 may be combined with another component in a generic mobile computing device 950. In one or more embodiments, an entire system may be made up of a plurality of generic computing devices 900 and/or a plurality of generic computing devices 900 coupled to a plurality of generic mobile computing devices 950.

In one embodiment, the generic mobile computing device 950 may comprise at least one of a mobile compatible processor 952, a mobile compatible memory 954, and an input/output device such as a mobile display 966, a communication interface 972, and a transceiver 958, among other components. The generic mobile computing device 950 may also be provided with a storage device, such as a microdrive or other device, to provide additional storage. In one embodiment, at least one of the components indicated heretofore are inter-coupled using various buses, and several of the components may be mounted on a common motherboard.

The mobile compatible processor 952 may execute instructions in the generic mobile computing device 950, including instructions stored in the mobile compatible memory 954. The mobile compatible processor 952 may be implemented as a chipset of chips that include separate and multiple analog and digital processors. The mobile compatible processor 952 may provide, for example, for coordination of the other components of the generic mobile computing device 950, such as control of user interfaces, applications run by the generic mobile computing device 950, and wireless communication by the generic mobile computing device 950.

The mobile compatible processor 952 may communicate with a user through the control interface 956 and the display interface 964 coupled to a mobile display 966. In one embodiment, the mobile display 966 may be at least one of a Thin-Film-Transistor Liquid Crystal Display ("TFT LCD"), an Organic Light Emitting Diode ("OLED") display, and another appropriate display technology. The display interface 964 may comprise appropriate circuitry for driving the mobile display 966 to present graphical and other information to a user. The control interface 956 may receive commands from a user and convert them for submission to the mobile compatible processor 952. In addition, an external interface 962 may be provide in communication with the mobile compatible processor 952, so as to enable near area communication of the generic mobile computing device 950 with other devices. External interface 962 may provide, for example, for wired communication in some embodiments, or for wireless communication in other embodiments, and multiple interfaces may also be used.

The mobile compatible memory 954 may be coupled to the generic mobile computing device 950. The mobile compatible memory 954 may be implemented as at least one of a volatile memory and a non-volatile memory. The expansion memory 978 may also be coupled to the generic mobile computing device 950 through the expansion interface 976, which may comprise, for example, a Single In Line Memory Module ("SIMM") card interface. The expansion memory 978 may provide extra storage space for the generic mobile computing device 950, or may also store an application or other information for the generic mobile computing device 950. Specifically, the expansion memory 978 may comprise instructions to carry out the processes described above. The expansion memory 978 may also comprise secure information. For example, the expansion memory 978 may be provided as a security module for the generic mobile computing device 950, and may be programmed with instructions that permit secure use of the generic mobile computing device 950. In addition, a secure application may be provided on the SIMM card, along with additional information, such as placing identifying information on the SIMM card in a non-hackable manner.

The mobile compatible memory 952 may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 954, the expansion memory 978, a memory coupled to the mobile compatible processor 952, and a propagated signal that may be received, for example, over the transceiver 958 and/or the external interface 962.

The generic mobile computing device 950 may communicate wirelessly through the communication interface 972, which may be comprised of a digital signal processing circuitry. The communication interface 972 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio-frequency transceiver 958. In addition, short-range communication may occur, such as using a Bluetooth®, Wi-Fi, and/or other such transceiver. In addition, a GPS ("Global Positioning System") receiver module may provide additional navigation-related and location-related wireless data to the generic mobile computing device 950, which may be used as appropriate by a software application running on the generic mobile computing device 950.

The generic mobile computing device 950 may also communicate audibly using an audio codec 960, which may receive spoken information from a user and convert it to usable digital information. The audio codec 960 may likewise generate audible sound for a user, such as through a speaker (e.g., in a handset of the generic mobile computing device 950). Such a sound may comprise a sound from a voice telephone call, a recorded sound (e.g., a voice message, a music files, etc.) and may also include a sound generated by an application operating on the generic mobile computing device 950.

The generic mobile computing device 950 may be implemented in a number of different forms, as shown in the figure. In one embodiment, the generic mobile computing device 950 may be implemented as a smartphone 968. In another embodiment, the generic mobile computing device 950 may be implemented as a personal digital assistant ("PDA"). In yet another embodiment, the generic mobile computing device, 950 may be implemented as a tablet device 982.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal display ("LCD") monitor) for displaying information to the user and a keyboard and a mouse 924 by which the user can provide input to the computer. Other kinds of devices can be used to provide for interaction with a user as well; for example, feedback provided to the user can be any form of sensory feedback (e.g., visual feedback, auditory feedback, and/or tactile feed-back) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

What is claimed is:

1. A computer-implemented method of updating a platform system firmware and a component device firmware through a single interface protocol, comprising:
    assigning a unique index number to each of a platform system and a component device;
    generating a platform system firmware payload comprising a platform payload header and a system firmware update image;
    receiving a component device firmware payload comprising a component firmware update image from a component device manufacturer;
    generating a firmware update package comprising a package header, the platform system firmware payload, the component device firmware payload, and a component payload header, wherein the platform system firmware payload comprises the platform payload header having the unique index number assigned to the platform system and the component device firmware payload comprises the component payload header having the unique index number assigned to the component device;
    querying the platform payload header and the component payload header using a check image application programming interface (API) for a matching unique index number; and
    updating at least one of the platform system firmware and the component device firmware by passing at least one of the platform system firmware payload and the component device firmware payload as a parameter, respectively, to a set image API.

2. The method of claim 1, wherein:
    the system firmware update image, the component firmware update image, the check image API, and the set image API comply with a unified extensible firmware interface (UEFI) standard.

3. The method of claim 1, wherein:
    the platform system firmware is a firmware of the platform system stored in a non-volatile memory of the platform system; and
    the component device firmware is a firmware of the component device coupled to the platform system.

4. The method of claim 3, wherein:
    the component device firmware is stored in a storage memory separate from the non-volatile memory storing the platform system firmware and is accessed through a separate bus when updating the component device firmware.

5. The method of claim 1, wherein:
the package header comprises at least one of a platform compatibility data, a package size data, and a package integrity data.

6. The method of claim 1, further comprising:
authenticating the firmware update package using at least one of a digital signature and a digital certificate.

7. The method of claim 1, further comprising:
permitting at least one of a factory update and an over-the-air update to at least one of the platform system firmware and the component device firmware.

8. The method of claim 1, further comprising:
rejecting at least one of the platform payload header and the component payload header if the unique index number does not match when querying the platform payload header and the component payload header using the check image API.

9. The method of claim 1, wherein:
the firmware update package is generated using a stand-alone application compatible with at least one of a Windows® computing device and a Linux® computing device.

10. A computer-implemented method of updating a plurality of component device firmwares through a single interface protocol, comprising:
assigning a unique index number to each of a plurality of component devices coupled to a platform system;
receiving a plurality of component device firmware payloads, each comprising a component firmware update image, from a plurality of component device manufacturers;
generating a firmware update package comprising a package header, a plurality of component device firmware payloads, and a plurality of component payload headers, wherein each of the plurality of component device firmware payloads comprises one of the plurality of component payload headers having the unique index number assigned to each of the plurality of component devices;
querying the plurality of component payload headers using a check image application programming interface (API) for a matching unique index number; and
updating at least one of the plurality of component device firmwares by passing at least one of the plurality of component device firmware payloads as a parameter to a set image API.

11. The method of claim 10, wherein:
the component firmware update image, the check image API, and the set image API comply with a unified extensible firmware interface (UEFI) standard.

12. The method of claim 10, wherein:
each of the plurality of component device firmwares is a firmware of each of the plurality of component devices coupled to the platform system.

13. The method of claim 12, wherein:
at least one of the plurality of component device firmwares is stored in a storage location separate from a storage memory storing at least one other of the plurality of component device firmwares and is accessed through a separate bus when updating the component device firmware.

14. The method of claim 10, wherein:
the package header comprises at least one of a platform compatibility data, a package size data, and a package integrity data.

15. The method of claim 10, further comprising:
authenticating the firmware update package using at least one of a digital signature and a digital certificate.

16. The method of claim 10, further comprising:
permitting at least one of a factory update and an over-the-air update to at least one of the plurality of component device firmwares.

17. The method of claim 10, further comprising:
rejecting at least one of the plurality of component device firmware payloads if the unique index number does not match when querying the plurality of component payload headers using the check image API.

18. The method of claim 10, wherein:
the firmware update package is generated using a stand-alone application compatible with at least one of a Windows® computing device and a Linux® computing device.

19. A computer-implemented method of updating a plurality of hardware features of a platform system through a single interface protocol, comprising:
assigning a unique index number to each of the plurality of hardware features;
receiving a plurality of empty payloads, each comprising a feature update command from at least one of a plurality of component device manufacturers;
generating a feature update package comprising a package header, the plurality of empty payloads, and a plurality of feature payload headers, wherein each of the plurality of empty payloads comprises one of the plurality of feature payload headers having the unique index number assigned to each of the plurality of hardware features;
querying the plurality of empty payloads using a check image application programming interface (API) for a matching unique index number; and
updating at least one of the plurality of hardware features by passing at least one of the plurality of empty payloads comprising the feature update command as a parameter to a set image API.

20. The method of claim 19, wherein:
the check image API and the set image API comply with a unified extensible firmware interface (UEFI) standard.

* * * * *